United States Patent Office 3,436,580
Patented Apr. 1, 1969

3,436,580
STATOR END TURN BRACING SYSTEM
Thomas E. Brennan, Schenectady, and Howard C. Ward, Jr., Albany, N.Y., assignors to General Electric Company, a corporation of New York
Filed Oct. 14, 1966, Ser. No. 586,752
Int. Cl. H02k 3/46
U.S. Cl. 310—260          2 Claims

ABSTRACT OF THE DISCLOSURE

An axial restraint for the end turn support rings of a dynamoelectric machine takes the form of a plurality of circumferentially spaced supporting brackets, each secured at one end to the outer end turn support ring and extending around the nose of the end turns to an attachment to the inner end turn support ring. The restraint is a substantially C-shaped bracket spaced throughout its length from the end turns and fabricated of metallic strap material and including a covering of electrically insulating material.

---

Figure 1:
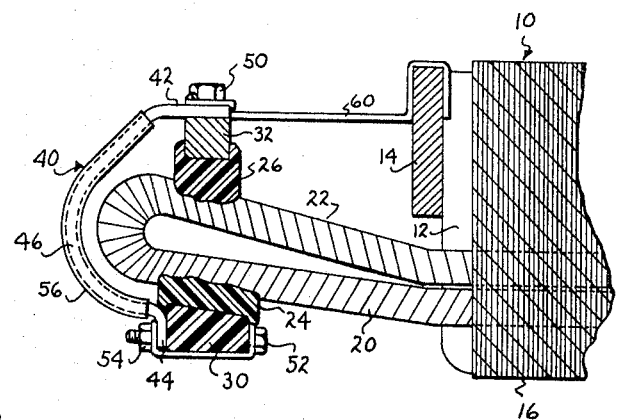

The present invention pertains to means for supporting the stator and turns in a dynamoelectric machine.

For a detailed description of end turn bracing systems of the kind to which this invention pertains, reference may be had to copending U.S. patent application Ser. No. 310,600, filed Sept. 23, 1963 and assigned to the assignee of this patent application. In accord with a teaching of the aforementioned patent application, a stator end turn bracing system can include an outer ring of hard insulating material encircling the radially outer end turn layer, an inner ring of hard insulating material surrounded by the radially inner layer of end turns, and reinforcing rings partially embedded in each of the outer and inner rings. The end turn layers customarily slope radially outwardly from the core. Accordingly, the support rings tend to slip axially in normal service, when subjected to vibration.

In support systems of the aforementioned kind, it has heretofore been a practice to provide axial movement restraints for each support ring in the form of studs, or the like, projecting substantially axially from the core and engaging the reinforcing rings. In the typical case, the core extends a substantial distance radially outwardly from the slots and is otherwise readily adapted to receive axial restraining means for the outer support ring. More often than not, a flange, or the like, is conveniently available for the attachment. On the other hand, the core extends only a relatively short distance radially inwardly of the slots, making it difficult to suitably attach an axially projecting stud for purpose of positioning the inner support ring.

Accordingly, it is a principal object of this invention to provide means for restraining axial movement of an inner end turn support ring, without requiring axial bracing means therefor attached to the radially inner portion of an associated stator core.

Briefly, we have discovered that an axial restraint for the end turn support rings can take the form of a plurality of circumferentially spaced supporting brackets each secured at one end to the outer end turn support ring and extending around the nose of the end turns to an attachment to the inner end turn support ring. With the inner and outer end turn support rings secured in relative axial alignment, there is provided a bracing system wherein both rings remain axially positioned in the presence of magnetic and/or mechanical vibratory forces tending to cause axial displacement thereof. In a further embodiment, the support can include one or more means for axially positioning the outer ring relative to the core.

Figure 2:
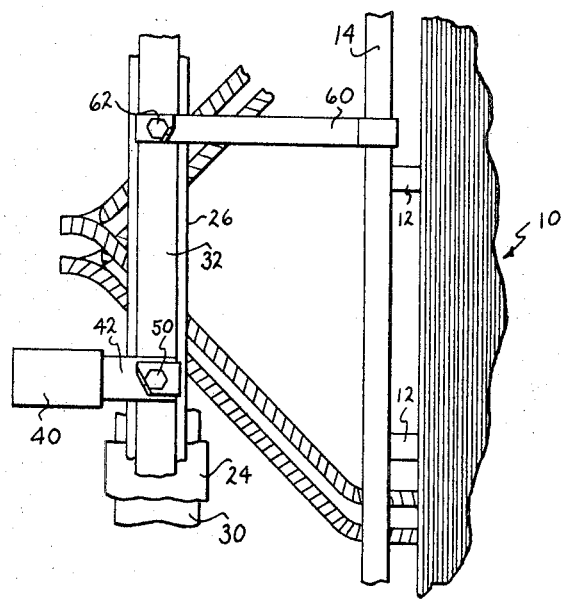

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing in which:

FIGURE 1 is a partial cross section view of a stator, illustrating a preferred embodiment of the invention; and FIGURE 2 is a partial top view of the embodiment of FIGURE 1.

Referring to the drawing, wherein like reference characters designate like or corresponding parts, there is depicted a dynamoelectric machine stator core 10 that is adapted to be mounted in a stator frame (not shown) to comprise the stationary part of an electric motor or generator, in a well-known manner. Core 10 can be fabricated from a plurality of ferromagnetic laminations, or punchings, that are secured together in a stack by means of a compressive force exerted by a finger block 12 and flange 14 assembly, for example. The radially inner surface 16 of core 10 defines a rotor-receiving cylindrical bore and the core includes a plurality of axially extending, circumferentially spaced, slots adjacent the bore, and most commonly opening into the bore.

A suitable winding is positioned in the slots of core 10 and includes radially inner and radially outer overlapping layers of circumferentially spaced end turns 20 and 22, respectively. The machine features an end turn bracing system that is preferably tieless and comprises inner and outer rings 24 and 26, respectively, of substantially inflexible insulating material that is advantageously selected to include a cured thermosettable resin. Inner ring 24 bears against and conformes to a portion of the inner surface of inner end turn layer 20. Outer ring 26 is similarly disposed with respect to the outer surface of the outer end turn layer 22. Reinforcing, or back-up, rings 30 and 32 are partially embedded in the exposed radial surface of rings 24 and 26, respectively. In a preferred embodiment, inner reinforcing ring 30 is fabricated of non-magnetic material, preferably cured polyester resin, and outer ring 32 is fabricated of steel. From a strictly structural viewpoint, steel is an advantageous material for both of rings 30 and 32; however, it has been found desirable oftentimes to have the former nonconductive to minimize induced circulating and eddy currents.

The described tieless bracing system comprising conformed insulating rings with back-up hoops, and its method of manufacture, are set forth in detail in the aforementioned copending patent application. Accordingly, in the interest of succinctly and clearly describing the present invention, the teaching of said prior application is incorporated by reference herein rather than repeating portions of the disclosure thereof.

In accord with the teaching of this invention, the inner reinforcing ring 30 and outer reinforcing ring 32 are fixed axially relative to each other, as opposed to the previous practice of axially positioning each ring individually relative to the core 10 by means of threaded studs or the like. By fixing the relative axial positions of the ring assemblies, the axial position of each assembly relative to the core 10, and end turns, is similarly determined. More specifically, because of the end turn axial taper, ring 26 cannot move further axially outward from the core 10 and, conversely, ring 24 cannot move further axially inward toward core 10. Thus, the axial position of each ring is fixed by combining them in accordance with the invention, although a bracket attachment of ring 32 to core 10 can be used additionally, as will be described presently.

The drawing depicts the presently preferred embodiment of the invention and shows a substantially C-shaped bracket 40 which substantially fixes reinforcing rings 30 and 32 in relative axial position. Bracket 40 advantageously lies substantially in a radial plane through the machine axis. Because of the engagement of reinforcing ring 32 with ring 26 and the corresponding engagement of reinforcing ring 30 and ring 24, it is apparent that rings 26 and 24 are similarly substantially fixed in relative axial position. Thus, it can be said that the inner end turn support assembly, comprising both reinforcing ring 30 and ring 24, and the outer end turn support assembly, comprising reinforcing ring 32 and ring 26, are substantially fixed in axial position.

Bracket 40 preferably extends around and is spaced outwardly from the nose, or axially outermost portion, of the end turns and has one end 42 thereof fastened to reinforcing ring 32 and the other end 44 thereof fastened to reinforcing ring 30. Bracket 40 is conveniently fabricated from a flat bar stock of non-magnetic steel to provide a metal strap 46. Suitable fastening means include welding or bonding with an adhesive, depending upon the particular materials selected, although the bolted construction illustrated is presently preferred. Toward this end, bolt-receiving holes are conveniently provided in ends 42 and 44 for receiving bolts 50 and 52, respectively. Bolt 50 is threaded into a radially outwardly extending aperture formed in reinforcing ring 32 for the purpose. Bolt 52 is more conveniently inserted through an axial hole in reinforcing ring 30 and secured by a nut 54, particularly in the case where ring 30 is of non-metallic material.

It is highly desirable to equip strap 46 with a sheath 56 of insulating material, if the strap 46 is fabricated of conductive material. One suitable insulating sheath is made by wrapping with a one-half lap of resin-impregnated glass tape, overwrapping with a mica tape and finishing with another wrapping of resin-impregnated glass tape.

Means can be provided for directly axially positioning reinforcing ring 32 from core 10. Such means can take the form of a plurality of circumferentially spaced clip brackets, as 60, for example. Clip bracket 60 is secured to ring 32 by any suitable means, as by bolt 62, and is conveniently attached to flange 14 by means of a U-shaped portion adapted to receive the flange 14 as shown. Bracket 60 additionally serves to ground the end turn support system to the core. The bracket 60 can be of relatively thin flexible construction, as shown, inasmuch as it has been found that the rigid brackets heretofore used, as studs or the like threaded into the core, are not required for axial positioning of a bracing system in accord with this invention, although they may be used, of course.

Bracket 60 is equally advantageously tied, welded, bolted or the like to core 10 in many cases. A principal purpose of the bracket 60 is to prevent circumferential movement, or turning, of the support assemblies. The latter is occasioned because the well-known end turn pattern is such that rings 24 and 26 can be considered to be threaded thereabout and circumferential movement must accompany any small axial displacement thereof.

In many applications, and particularly in larger size machines, axially outwardly projecting, adjustable jacking bolts (not shown) are threaded into ring 32. The jacking bolts are backed out, against the frame, during final assembly to impart a predetermined compressive loading therein.

In a presently preferred construction a plurality of brackets 40 and 60 are alternately spaced circumferentially about the end turn layers at intervals of sixty mechanical degrees. That is to say, there are three brackets of each kind used for the support assembly described. Of course, more or fewer brackets can be used and a symmetrical spacing is not essential.

There has been described an end turn support comprising inner and outer insulated ring assemblies that are distinct from each other, that is to say, the assemblies are not formed as parts of the same body of material as in the case of encapsulated end turns. The rings are axially positioned relative to each other by means of a plurality of circumferentially spaced brackets extending around the nose of the end turns and spaced therefrom. This construction does not substantially restrict the desirable coolant passages in and around the individual end turn noses, while at the same time axially positioning both ring assemblies relative to the end turns, without requiring any direct attachment of the inner ring assembly to the core.

The foregoing is a description of an illustrative embodiment of the invention, and it is applicant's intention in the appended claims to cover all forms which fall within the scope of the invention.

What we claim as new and desire to secure by Letters Patent of the United States is:

1. In a dynamoelectric machine having, a magnetic core and a winding in said core including inner and outer overlapping layers of circumferentially spaced end turns, and an end turn support structure comprising an outer ring of substantially inflexible insulating material disposed around the outer layer of end turns and an inner ring of substantially inflexible insulating material disposed radially inwardly of the inner layer of end turns, said rings respectively contacting and conforming to portions of the surface of said outer and inner end turn layers, an outer reinforcing ring bearing against and partially embedded in the radially outer surface of said outer ring, and an inner reinforcing ring bearing against and partially embedded in the radially inner surface of said inner ring, the improvement of means for axially orienting said support structure relative to said winding, said means comprising: a substantially C-shaped bracket extending around the nose of the end turns and having one end thereof fastened to said outer reinforcing ring and the other end thereof fastened to said inner reinforcing ring, said C-shaped bracket spaced throughout its length from said end turns and fabricated of metallic strap material and includes a convering of electrically insulating material.

2. The machine of claim 1 including an axially extending clamp secured to said core and to said outer reinforcing ring to provide circumferential and additional axial restraint for said end turn support structure.

References Cited

UNITED STATES PATENTS

| 1,123,085 | 12/1914 | Brown et al. | 310—260 |
| 3,320,452 | 5/1967 | Fortenbach et al. | 310—270 |
| 3,344,296 | 9/1967 | Coggeshall et al. | 310—270 |

WARREN E. RAY, *Primary Examiner.*

R. SKUDY, *Assistant Examiner.*

U.S. Cl. X.R.

310—270